Nov. 11, 1958  W. H. ADAMS  2,859,617
THERMAL FLOWMETER
Filed Oct. 22, 1954

INVENTOR:
William H. Adams
By Herbert E. Metcalf
His Patent Attorney

_United States Patent Office_ 2,859,617
Patented Nov. 11, 1958

2,859,617

THERMAL FLOWMETER

William H. Adams, Manhattan Beach, Calif., assignor to Northrop Aircraft, Inc., Hawthorne, Calif., a corporation of California Application October 22, 1954, Serial No. 463,979

2 Claims. (Cl. 73—204)

This invention relates to flow measuring systems, and more particularly to a device for measuring liquid or gas flow in terms of a differential temperature measurement.

Flow meters are known to the art wherein the rate of flow of a fluid over a surface, or the like, is measured by sensing the temperature changes of the surface caused by the friction of the fluid flowing thereover. All require careful calibration against known standards, and ambient temperature tolerances.

In the present invention, a temperature compensated differential sensing system is used, wherein fluid temperature changes are compensated for, and only differential temperature measurements determine the flow rate.

In broad terms, the present invention in one form comprises two temperature sensing equally resistive probes positioned in a flow line, one probe being exposed to the temperature of the liquid or gas, but not the flow, the other probe being exposed to the velocity of the flow. When these two probes are connected in adjoining legs of a Wheatstone bridge circuit for example, and exposed to the same temperature, their resistance will be equal, resulting in a zero voltage output from the bridge. The probes are not electrically heated above ambient temperature. Any flow friction occurring at one probe and not the other will create a temperature unbalance in the probes, i. e., a rise in temperature of the flow-exposed probe, which will result in an output voltage from the bridge. This voltage can be used as a control for a self-balancing potentiometer, or the like, or the voltage can be measured with a voltmeter which has been calibrated in terms of flow.

It is an object of the present invention to provide a novel flow meter to measure liquid or gas flow in terms of a differential temperature measurement.

Another object of the invention is to provide a flow meter which is temperature compensated for fluid temperature changes.

Yet another object of the invention is to provide a flow meter that can be adapted to any fluid supply line.

Still another object of the invention is to provide a flow meter that will require a minimum of auxiliary equipment and can be accurately calibrated.

Other more specific objects of the invention will appear from the disclosure of the following detailed description thereof, having reference to the accompanying drawings which illustrate a preferred embodiment thereof and constitute a part of said disclosure.

Figure 1:
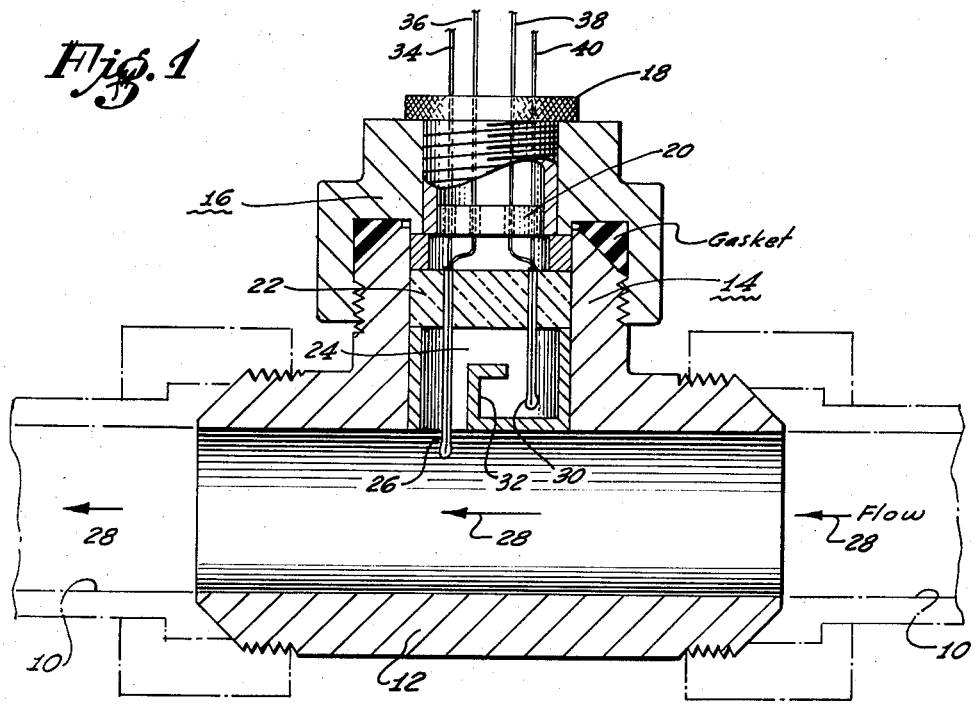
Figure 1 is a longitudinal sectional view of one embodiment of the invention useful in measuring liquid fuel flow.

Referring first to Figure 1, the numeral 10 indicates a fuel supply line within which the fuel flow rate is to be measured. The device in accordance with the present invention includes a standard "T" union 12 adapted to be inserted in the fuel supply line 10.

The lateral projection 14 of the "T" union 12 is provided with a fluid tight cap screw fitting 16 which is adapted to receive a fluid tight screw plug 18, an insulator 20, and a fluid tight dead end partition 22, having positioned within the chamber 24 of the lateral projection 14 of the "T" union 12 and supported by the partition 22, a first temperature sensing thermistor bulb 26 extending into the fuel flow 28, and a second temperature sensing thermistor bulb 30 extending into the chamber 24 which is shielded from direct fuel flow 28 in the line 10 by a baffle 32 which is arranged so that the sensing thermistor bulb 30 is isolated from direct fuel flow 28 and turbulence therefrom.

The electrical leads 34, 36 from the first thermistor bulb 26 and the electrical leads 38, 40 from the second thermistor bulb 30 are extended through the insulator 20 and screw plug 18 and insulated therefrom.

Figure 2:
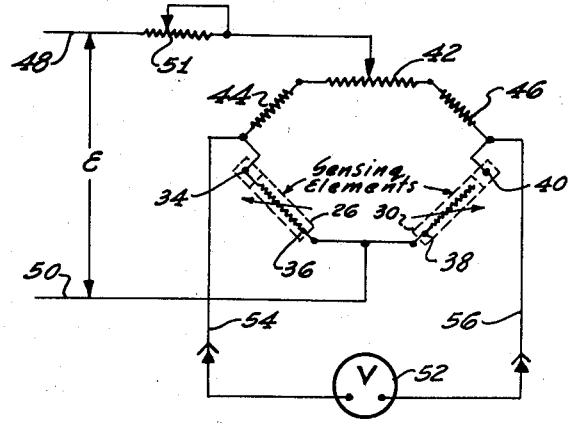
Figure 2 is an electrical wiring diagram for the flowmeter bridge circuit.

The electrical leads 34, 36 and 38, 40 from the temperature sensing resistive elements 26 and 30, respectively, are connected to adjacent arms of a Wheatstone bridge as shown in the circuit diagram of Figure 2.

In Figure 2 the electric bridge circuit consists of a zero balance variable resistor 42, a resistor 44 in one arm of the bridge, and another resistor 46 in the adjacent arm of the bridge. The electrical leads 34, 36 and 38, 40 from the respective sensing elements 26 and 30 are connected in adjacent arms of the lower half of the bridge, opposite from the resistors 44 and 46. A source of electric potential E, preferably a regulated supply, is connected to the bridge circuit at 48 and 50 through the range adjustable resistor 51. A voltage indicating means 52 such as a voltmeter, or the like, is connected to the bridge output leads 54, 56 and calibrated in terms of flow.

In use, the particular construction of the flow meter of the present invention as shown in Figure 1 is connected in a fuel supply line 10 to indicate the fuel flow rate.

When there is no fuel flow in the supply line 10, the sensing elements 26 and 30 will sense the same temperature and the electric bridge can be balanced by the zero-adjust variable resistor 42. With fluid flowing through the line 10 a higher temperature is recorded by the sensing element 26 than by the sensing element 30. This temperature differential is due to friction, impact and the compressibility effect of the fluid as it flows by and impinges on the sensing element 26. This temperature differential results in a resistive unbalance in the bridge circuit which is indicated by the voltmeter 52 previously calibrated in fuel flow rate.

The flow meter, herein described, has been found to provide a simple and accurate system for measuring fuel flow in a supply line, particularly at high rates of flow. In an actual operating device of the kind described, the bridge circuit was connected to a power source of 24 volts D. C.; the range-adjust variable resistor 51, 5000 ohms; the zero balance adjustable resistor 42, 1000 ohms; the resistor 44, 1500 ohms; the resistor 46, 1500 ohms. The temperature sensing elements 26 and 30 were each 2000 ohms at 70° C. thermistor bulbs and were connected in adjacent legs of the bridge as shown in Figure 2. The bridge output leads 54, 56 were connected to a 0–5 volt D. C. voltmeter. Thus as well as giving indications of the flow rate, the present invention provides signals, read by the voltmeter 52, which are suitable for driving other equipment, or for providing the flow rate information in the required form for being telemetered to a remote station.

From the foregoing description and explanation of the present invention it will be readily seen that a novel simple and accurate flow meter, which is substantially temperature compensated, can be easily assembled and economically produced, and that the means specifically illustrated and described can be duplicated by anyone skilled in the art.

While in order to comply with the statute, the present invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A flow meter comprising a T union inserted into a fluid line; a fluid tight cap screw fitting threaded onto the lateral projection of said union; a fluid tight screw plug in said cap screw; an insulator retained in said lateral projection by said plug; a fluid tight dead end partition in said lateral projection; a pair of thermistor bulbs supported by said partition, one of said thermistor bulbs extending into the path of fluid flow; a baffle in said lateral projection that prevents fluid flow from passing about the other of said thermistor bulb; and electrical leads extending from each thermistor bulb outwardly through the insulator and plug; said leads from each bulb being connected to adjacent arms of a Wheatstone bridge.

2. A flow meter comprising a T union inserted into a fluid line; a fluid tight cap screw fitting threaded onto the lateral projection of said union; a fluid tight screw plug in said cap screw; an insulator retained in said lateral projection by said plug; a pair of temperature sensing elements mounted in said lateral projection so that one extends into the path of fluid flow; a baffle in said lateral projection that prevents fluid flow from passing about the other of said temperature sensing elements; and electrical leads extending from each sensing element outwardly through the insulator and plug; said leads from each element being connected to adjacent arms of a Wheatstone bridge.

References Cited in the file of this patent

UNITED STATES PATENTS

| | | |
|---|---|---|
| 2,412,471 | Olson | Dec. 10, 1946 |
| 2,536,037 | Clousing | Jan. 2, 1951 |
| 2,591,195 | Picciano | Apr. 1, 1952 |
| 2,694,928 | Jacobson | Nov. 23, 1954 |

FOREIGN PATENTS

| | | |
|---|---|---|
| 357,100 | Germany | Aug. 19, 1922 |
| 888,695 | France | Dec. 20, 1943 |